Feb. 19, 1929.                W. M. BAUMHECKEL                1,702,889
                              AUXILIARY TRANSMISSION
                              Filed Oct. 5, 1925          2 Sheets-Sheet 1
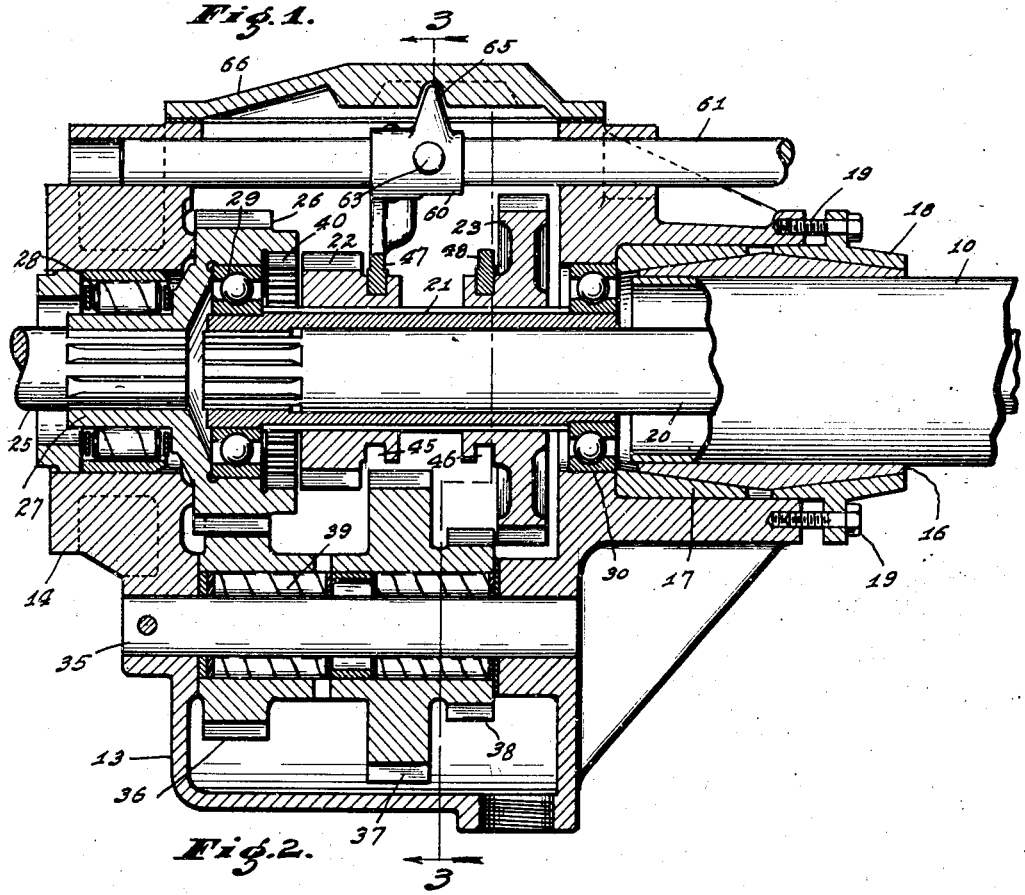
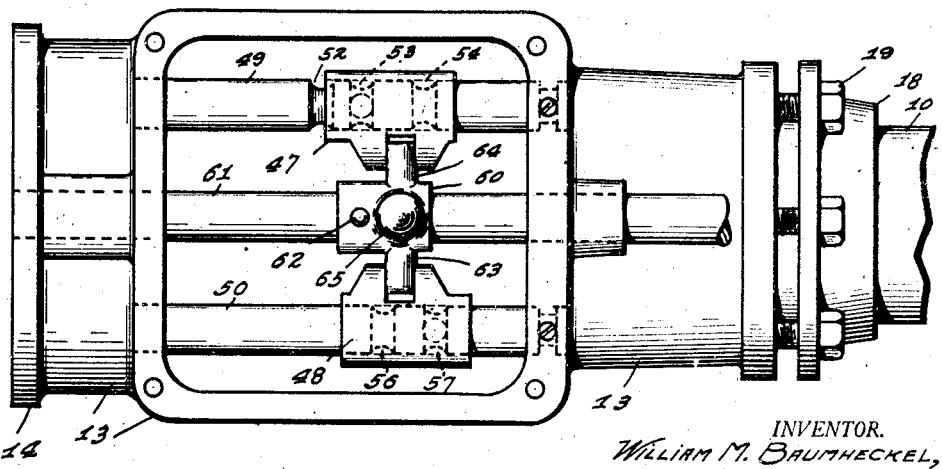
INVENTOR.
WILLIAM M. BAUMHECKEL,
BY
ATTORNEY.

Feb. 19, 1929. 1,702,889
W. M. BAUMHECKEL
AUXILIARY TRANSMISSION
Filed Oct. 5, 1925 2 Sheets-Sheet 2
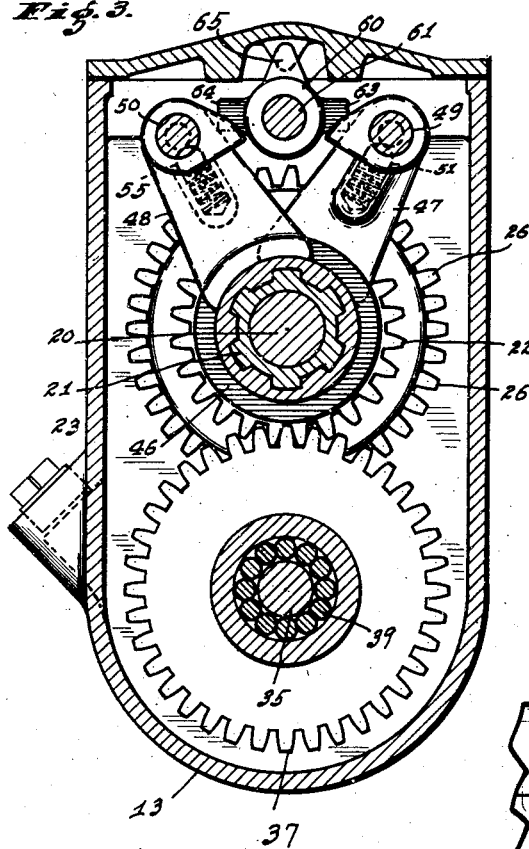
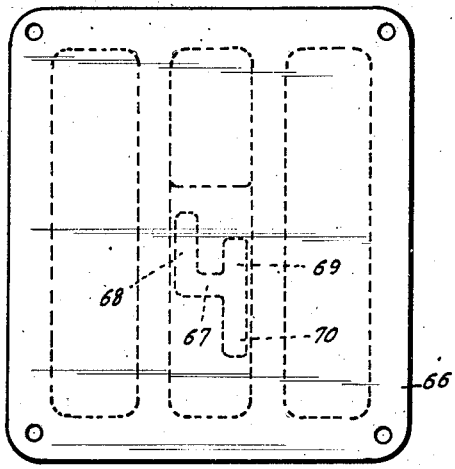
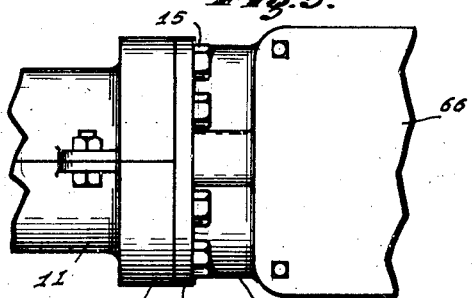
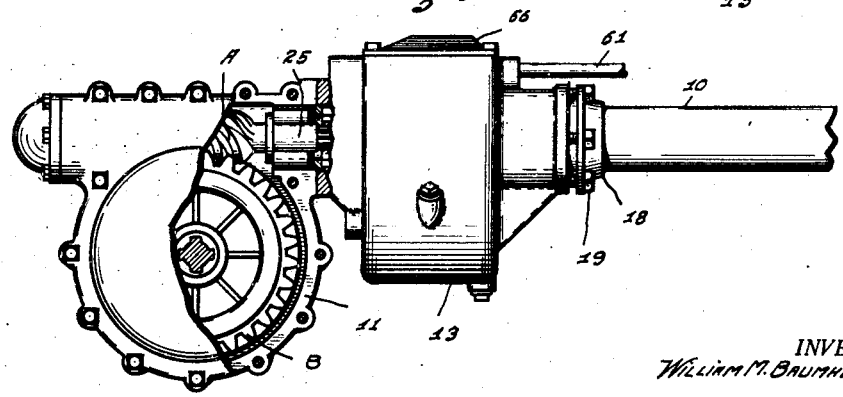
INVENTOR.
William M. Baumheckel,
BY
*G. B. Schley,*
ATTORNEY.

Patented Feb. 19, 1929.

1,702,889

UNITED STATES PATENT OFFICE.

WILLIAM M. BAUMHECKEL, OF CONNERSVILLE, INDIANA, ASSIGNOR TO LINCOLN MANUFACTURING COMPANY, OF CONNERSVILLE, INDIANA, A CORPORATION OF INDIANA.

AUXILIARY TRANSMISSION.

Application filed October 5, 1925. Serial No. 60,473.

It is the object of my invention to produce an auxiliary transmission adapted to be inserted between the propeller shaft and the rear axle drive shaft of an automobile to permit a greater variation in speed than can be obtained with the transmission regularly supplied by the automobile manufacturer. A further object of my invention is to produce such a transmission which can be applied to the automobile with a minimum amount of alteration of the standard autobile parts as supplied by the manufacturer. I accomplish the above objects by removing the rear end of the casing surrounding the propeller shaft, and I mount on the rear end of the propeller-shaft a sleeve which slidably carries suitable gears, I mount a gear on the rear axle drive shaft, and I provide gears for connecting the gears on the propeller-shaft sleeve with the gear on the rear axle drive shaft. Suitable means are provided for selectively sliding gears on the propeller-shaft sleeve to effect a direct connection, a speed reducing connection, or a speed increasing connection between the propeller shaft and the rear axle drive shaft.

The accompanying drawings illustrate my invention: Fig. 1 is a vertical central section through my auxiliary transmission; Fig. 2 is a plan of my transmission with the cover removed to show details of the operating mechanism; Fig. 3 is a transverse section on the line 3—3 of Fig. 1; Fig. 4 is a plan of the transmission cover; Fig. 5 is a plan view showing the method of attaching my transmission to the rear axle housing; and Fig. 6 is a side elevation on a reduced scale with part of the rear axle housing broken away to show details of construction.

In the automobile as supplied by the manufacturer, the propeller-shaft tube 10 extends rearwardly to a point adjacent the rear axle housing 11 and is there provided with a fitting (not shown) by which it is attached to a flange 12 on the rear axle housing. In attaching my transmission to the automobile, it is only necessary to remove this fitting and a short length from the rear end of the propeller-shaft tube.

The various parts of my transmission are mounted in a casing 13 which is supported between the rear end of the propeller-shaft tube 10 and the rear axle housing 11. To this end, the casing 13 is provided with a flange 14 which may be attached by suitable screws 15 to the flange 12 of the rear axle housing. The forward end of the casing 13 is provided with a recess within which the rear end of the shortened propeller-shaft tube 10 is received. Surrounding the rear end of the tube 10 is a collapsible bushing 16, the exterior surface of which tapers from the center to the ends of the bushing to provide conical surfaces, one of which bears against the conical inner surface of a bushing 17 located in the recess of the casing 13 and the other of which is received within a cap 18 which, by means of screws 19, may be forced toward the casing 13 to collapse the bushing 16. This collapsible bushing and the parts associated with it are described in greater detail in the application of John C. Moore, Serial No. 33,897, filed June 1, 1925.

The rear end of the propeller shaft 20 extends into the casing 13 and is there provided with a sleeve 21. The inner surface of this sleeve near its rear end is provided with splines adapted to engage the splines on the rear end of the propeller shaft, but it is usually necessary that the sleeve extend forwardly along the propeller shaft beyond the splines. The exterior surface of the sleeve 21 is splined and slidably supports two gears 22 and 23. Owing to the spline connections provided, the sleeve 21 and gears 22 and 23 rotate with the shaft 20.

In the automobile as supplied by the manufacturer, the propeller shaft 20 is connected to the rear axle drive shaft 25 by any suitable means so that these two shafts rotate together. The rear axle drive shaft supports a worm A which mates with a worm gear B by which, through suitable differential mechanism, the rear wheels are driven.

In attaching my transmission, I remove the connection between the shafts 20 and 25 and mount on the forward end of the shaft 25 a gear 26, the bore of which is splined to provide for the reception of the splines on the front end of the shaft 25. Preferably, the gear 26 has a rearwardly extending hub 27 which may be rotatably supported in the casing 13 by a suitable anti-friction bearing such as the roller bearing 28 as shown. The gear 26 is counterbored to provide for the reception of an anti-friction bearing 29 which supports the rear end of the sleeve 21. Desirably, a second anti-friction bearing 30 is provided at the front of the casing 13 as a support for the forward end of the sleeve 21. The two bearings 29 and 30 are preferably ball bearings of the deep-grooved type shown in the drawings in order that they may serve as both thrust and radial bearings.

Rigidly mounted in the casing 13 parallel with the shafts 20 and 25 is a counter-shaft 35 on which is rotatably mounted three gears 36, 37 and 38 which are rigid with one another. Anti-friction bearings 39 may be provided for these gears.

As I prefer that my transmission provide a direct, a speed-reducing, and a speed-increasing connection between the propeller shaft 20 and the rear axle drive shaft 25, the gears on the sleeve 21 are larger and smaller in diameter respectively than the gear 26, with the rearmost gear 22 preferably smaller. To provide a direct connection between the two shafts 20 and 25, the gear 26 is recessed and provided interiorly with gear teeth 40 adapted to engage the teeth of the gear 22 when the gear 22 is moved into such recess. The gear 26 is constantly in mesh with the gear 36, and the gears 37 and 38 are of such diameters that they may mate respectively with the gears 22 and 23.

The gear 22 has three positions longitudinally of the sleeve 21. In the position shown in Fig. 1, the gear 22 is in its neutral position. If moved to the left from this position, its teeth 40 mesh with those in the recess in the gear 26 and provide a direct drive between the shafts 20 and 25. If the gear 22 is moved to the right from the position shown in Fig. 1, it engages and drives the gear 37 which in turn drives the gear 36 to provide a speed-reducing connection between the propeller shaft and the rear axle drive shaft.

The gear 23 has two positions on the sleeve 21. The position shown in Fig. 1 is a neutral position. If moved to the left from this position, the gear 23 engages the gear 38 with the result that the rear axle drive shaft 25 is rotated at a more rapid speed than is the propeller shaft 20.

Any suitable means may be provided for sliding the gears 22 and 23 to provide for selective speed control, but I prefer to employ the gear-shifting means illustrated in the drawings, as such means insure that one of the gears 22 and 23 is disengaged before the other can be engaged.

The gears 22 and 23 are provided respectively with annular grooves 45 and 46 adapted to receive respectively shifters 47 and 48 which are slidable respectively on rods 49 and 50 mounted in the casing 13 parallel with the shafts 20 and 25. The shifter 47 is preferably provided with some means such as the spring-pressed ball 51 adapted to engage any one of three grooves 52, 53 or 54 in the rod 49 to prevent accidental displacement of the shifter 47 and thus to insure that the gear 42 is definitely held in one of its three positions above described. The shifter 48 is provided with a similar spring-pressed ball 55 which is adapted to co-operate with either of two grooves 56 or 57 in the rod 50 to prevent accidental movement of the shifter 48.

The shifters 47 and 48 are operated by means of a shifter dog 60 rigidly mounted on a rod 61 as by means of a pin 62. The rod 61 extends longitudinally of the casing 13, is slidable and rotatable therein, and is located between the rods 49 and 50. The dog 60 is provided with oppositely extending arms 63 and 64 adapted to engage respectively slots in the inner faces of the shifters 47 and 48. In its neutral position, the dog 60 is in engagement with both shifters, but if the rod 61 is rotated slightly in either direction, the dog becomes disengaged from one shifter. Thus, if the rod 61 is rotated clockwise in Fig. 3, the arm 64 moves out of the slot in the shifter 48 so that if then the rod 61 is moved longitudinally of the casing 13 the shifter 47 and gear 22 will be moved while the shifter 48 and gear 23 will remain stationary. Rotation of the rod 61 in the opposite direction permits movement of the shifter 48 while allowing the shifter 47 to remain in its neutral position.

To prevent longitudinal movement of the rod 61 when it is engaged with both shifters 47 and 48, I provide the dog 60 with an upwardly projecting boss or lug 65 which is received in a guide slot in the under surface of the cover 66 of the casing 13. This slot has a transversely extending intermediate portion 67 provided at one end with a rearwardly extending portion 68 and at the other end with both a rearwardly extending portion 69 and a forwardly extending portion 70. Rotation of the shaft 61 in a clockwise direction (Fig. 3) disengages the arm 64 from the shifter 48 and moves the boss 65 to the right where it may enter either the rearwardly extending portion 69 or the forwardly extending portion 70 of the slot in the cover 66. Rotation of the rod 61 in a counter-clockwise direction disengages the arm 63 from the shifter 47 and moves the boss 65 to the left where it may enter the rearwardly extending portion 68 in the slot in the cover. When the rod 61 is in its center or neutral position, the boss 65 is in the intermediate portion 67 of the slot and the rod 61 cannot be moved longitudinally until it has been rotated sufficiently to bring the boss 65 into alinement with one on the other of the longitudinally extending slot-portions.

Any suitable means may be provided for operating the rod 61. With the parts in the position shown in the drawings, my auxiliary transmission is in neutral and rotation of the shaft 20 is not imparted to the rear axle drive shaft 25. If it is desired to effect a direct connection between the shafts 20 and 25, the rod 61 is rotated in a clockwise direction (Fig. 3) and then moved rearwardly to carry the teeth of the gear 22 into engagement with the teeth 40 of the gear 26. Because of the shape of the slot in the under surface of the cover 66, it is necessary to disengage the gear 22 from the gear 26 before the engagement of any other pair of gears can be affected. To change from direct drive to a speed-reducing drive, the rod 61 is merely moved forwardly thus disengaging the gear 22 from the gear 26 and engaging it with the gear 37. To change from direct or speed-reducing drive to a speed-increasing drive, the gear 22 is brought to its neutral position by longitudinal movement of the rod 61 which is then rotated to disengage the shifter dog arm 63 from the shifter 47 and to engage the arm 64 with the shifter 48. Rearward movement of the rod 61 then engages the gear 23 with the gear 38 to effect the desired speed-increasing connection.

I claim as my invention:—

1. An auxiliary transmission for automobiles having a propeller shaft and a co-axial rear-axle drive shaft closely abutting said propeller shaft, the adjacent ends of said two shafts being splined, said transmission being adapted to act between said two shafts and to be connected thereto without changing their construction, said transmission comprising a casing, a gear having an integral hub rotatably mounted in said casing, said hub having an axial splined bore for the reception of the splined end of said rear-axle drive shaft, a sleeve surrounding said propeller shaft, said sleeve being provided interiorly with splines to receive those on the end of said propeller shaft, said sleeve extending forwardly from the splined end of said propeller shaft and being rotatably supported near its forward end from said casing, a pair of gears rigid with each other and rotatably mounted in said casing on an axis parallel to that of said two shafts, one of said pair of gears meshing with said first named gear, a gear rotatable with said sleeve and axially slidable thereon into and out of mesh with the other gear of said pair of gears, said first named gear being provided with an axial recess for the reception of the rear end of said sleeve, and bearing means for rotatably supporting the rear end of said sleeve from said first named gear, said slidable gear and said first named gear being provided with co-operating clutch teeth engageable and disengageable by axial movement of said slidable gear.

2. An auxiliary transmission for automobiles having a propeller shaft and a co-axial rear-axle drive shaft closely abutting said propeller shaft, the adjacent ends of said two shafts being splined, said transmission being adapted to act between said two shafts and to be connected thereto without changing their construction, said transmission comprising a casing, a gear having an integral hub rotatably mounted in said casing, said hub having an axial splined bore for the reception of the splined end of said rear-axle drive shaft, a sleeve surrounding said propeller shaft, said sleeve being provided interiorly with splines to receive those on the end of said propeller shaft, said gear being provided with an axial recess into which the rear end of said sleeve extends, radial and thrust bearing means for supporting the rear end of said sleeve from said gear, radial and thrust-bearing means for supporting the front end of said sleeve from said casing, and speed-changing mechanism for operatively connecting said sleeve and gear.

3. An auxiliary transmission for automobiles having a propeller shaft and a co-axial rear-axle drive shaft closely abutting said propeller shaft, the adjacent ends of said two shafts being splined, said transmission being adapted to act between said two shafts and to be connected thereto without changing their construction, said transmission comprising a casing, a gear having an integral hub rotatably mounted in said casing, said hub having an axial splined bore for the reception of the splined end of said rear-axle drive shaft, a sleeve surrounding said propeller shaft, said sleeve being provided interiorly with splines to receive those on the end of said propeller shaft, said gear being provided with an axial recess into which the rear end of said sleeve extends, bearing means for supporting the rear end of said sleeve from said gear, and speed-changing mechanism for operatively connecting said sleeve and gear.

In witness whereof, I have hereunto set my hand at Connersville, Indiana, this 30th day of Sept., A. D. one thousand nine hundred and twenty-five.

WILLIAM M. BAUMHECKEL.